(12) United States Patent
Notomi

(10) Patent No.: US 6,845,229 B2
(45) Date of Patent: Jan. 18, 2005

(54) EDUCATIONAL INSTRUCTION SYSTEM

(76) Inventor: Seiji Notomi, Nisi-Sinjuku Park-Side Tower304, 23-1, Nisi-Sinjuku 6-chome, Shinjuku-ku, Tokyo (JP)

( * ) Notice: Subject to any disclaimer, the term of this patent is extended or adjusted under 35 U.S.C. 154(b) by 174 days.

(21) Appl. No.: 10/131,614

(22) Filed: Apr. 25, 2002

(65) Prior Publication Data

US 2003/0203347 A1 Oct. 30, 2003

(51) Int. Cl.$^7$ ............................................. G09B 3/00
(52) U.S. Cl. ..................... 434/350; 434/323; 434/362; 712/32; 709/203; 709/225
(58) Field of Search ................................. 434/118, 157, 434/169, 219, 307 R, 308, 322, 323, 335, 350, 353, 362, 365; 705/7; 709/203, 225; 712/32; 713/200–202; 345/751, 753; 706/927

(56) References Cited

U.S. PATENT DOCUMENTS

| | | | | | |
|---|---|---|---|---|---|
| 5,295,836 A | * | 3/1994 | Ryu et al. | ................... | 434/335 |
| 5,909,589 A | * | 6/1999 | Parker et al. | ................. | 712/32 |
| 6,002,915 A | * | 12/1999 | Shimizu | .................... | 434/350 |
| 6,155,840 A | * | 12/2000 | Sallette | ...................... | 434/323 |
| 6,213,780 B1 | * | 4/2001 | Ho et al. | .................... | 434/219 |
| 6,470,171 B1 | * | 10/2002 | Helmick et al. | ............ | 434/362 |
| 6,688,891 B1 | * | 2/2004 | Sanford | ...................... | 434/365 |
| 2001/0023059 A1 | * | 9/2001 | Toki | .......................... | 434/157 |
| 2002/0178038 A1 | * | 11/2002 | Grybas | ........................ | 705/7 |
| 2003/0110215 A1 | * | 6/2003 | Joao | .......................... | 709/203 |
| 2003/0186208 A1 | * | 10/2003 | Wen et al. | .................. | 434/350 |
| 2004/0030781 A1 | * | 2/2004 | Etesse et al. | ............... | 709/225 |

* cited by examiner

Primary Examiner—Joe H. Cheng
(74) Attorney, Agent, or Firm—Jeffrey S. Melcher; Manelli Denison & Selter, PLLC

(57) ABSTRACT

A main server 5 registers information about lecturers and students, and it introduces the lecturers to the students automatically. Thus, the system assists the lecture of the lecturers to be established. The lecturer connects the lecturer's terminal device 3 to the student's terminal device 4 via the network 1, and the lecturer holds lectures using them. The main server 4 also has functions of automatic managements of the schedule of the lectures and of billing of the tuition after the lectures are held.

According to this system, the lecturers and the students are introduced to each other automatically, and the lecturers' abilities are utilized for the students' convenience wherever the lecturers may live.

5 Claims, 5 Drawing Sheets

FIG.2
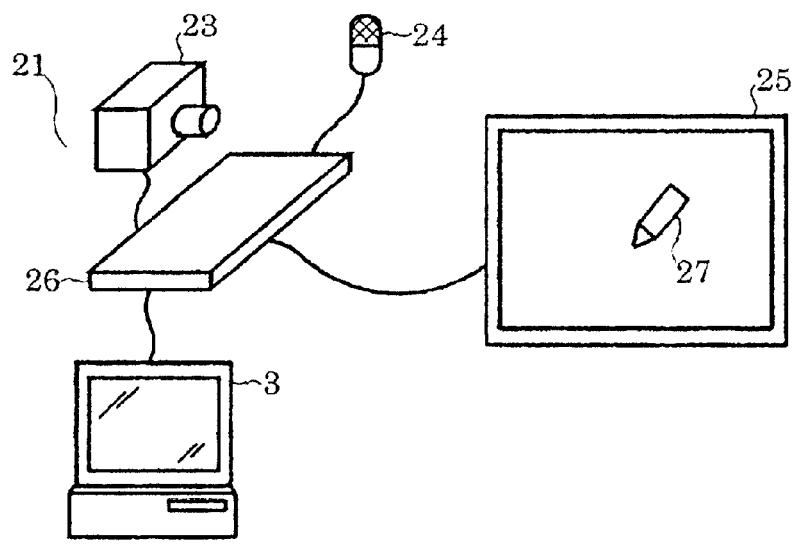
(a)
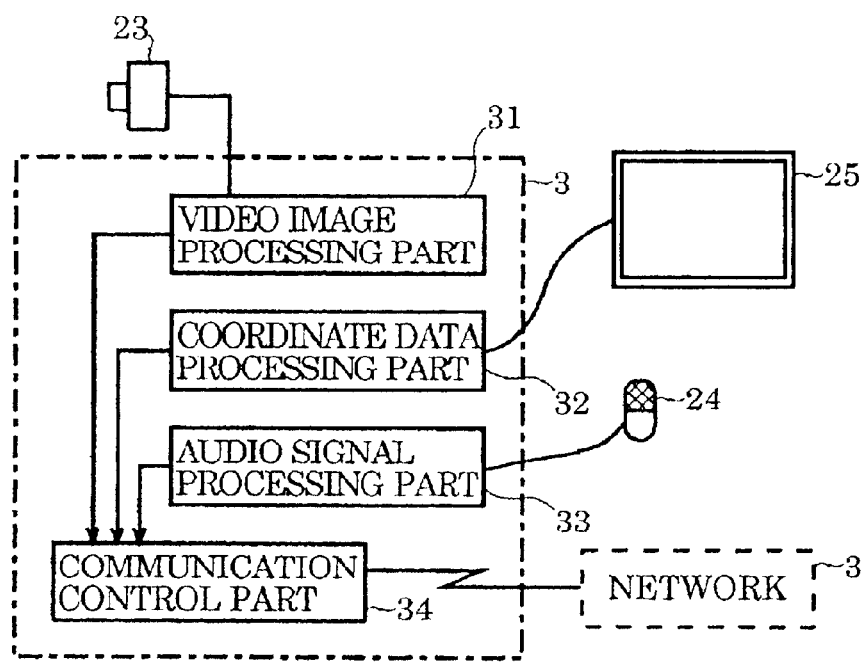
(b)

FIG.3

| SUBJECT OF LECTURE |
|---|
| DATE AND TIME OF LECTURE |
| LECTURER'S ACCOUNT FOR TUITION PAYMENT |
| LECTURER'S E-MAIL ADDRESS |
| METHOD OF LECTURE (INTERACTIVE/ONE-WAY) |
| LECTURER'S PROFILE |
| TEXT |

LECTURER REGISTRATION DATA
(a)

| SUBJECT STUDENT WANTS TO TAKE |
|---|
| DAYS AND TIMES WHEN STUDENT WANTS TO ATTEND LECTURES |
| STUDENT'S ACCOUNT FOR TUITION PAYMENT |
| STUDENT'S E-MAIL ADDRESS |
| METHOD OF LECTURE (INTERACTIVE/ONE-WAY) |
| LECTURERS WHOM STUDENT WANTS (PRIORITY ORDER) |

STUDENT'S REGISTRATION DATA
(b)

FIG.5
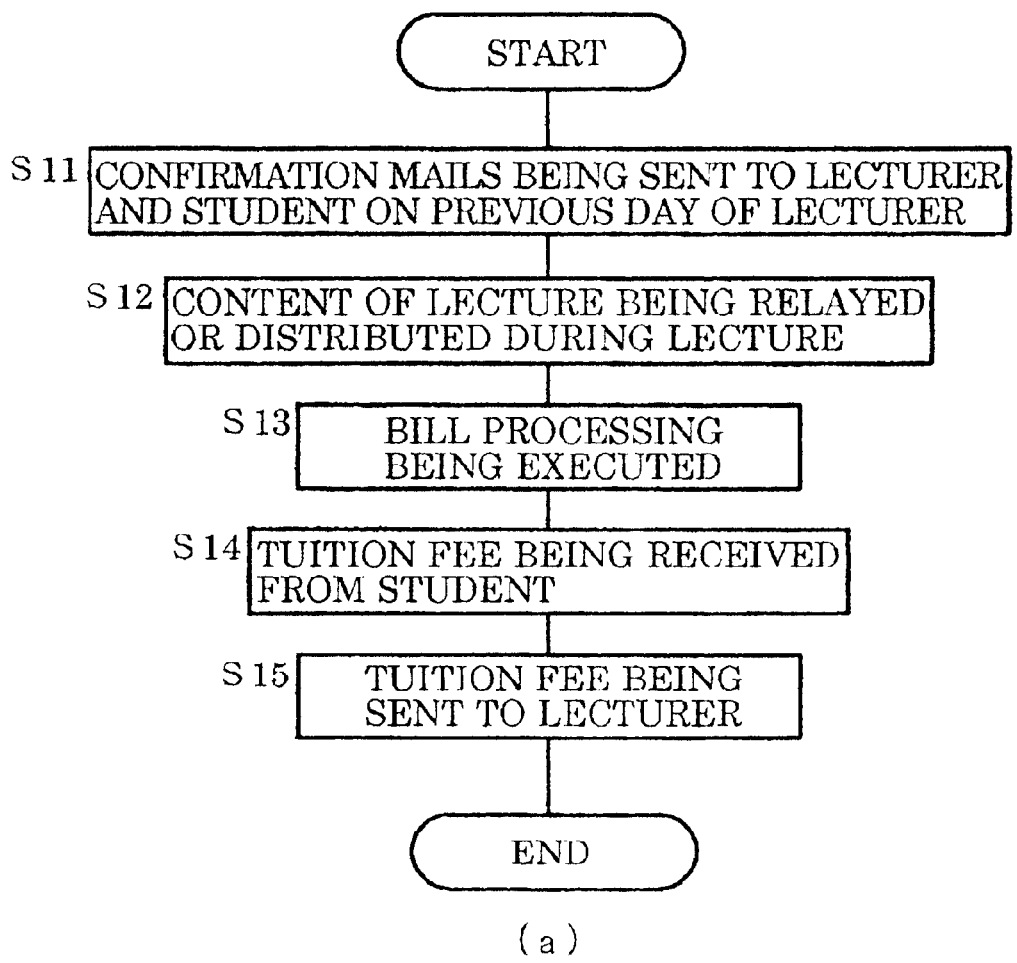
(a)
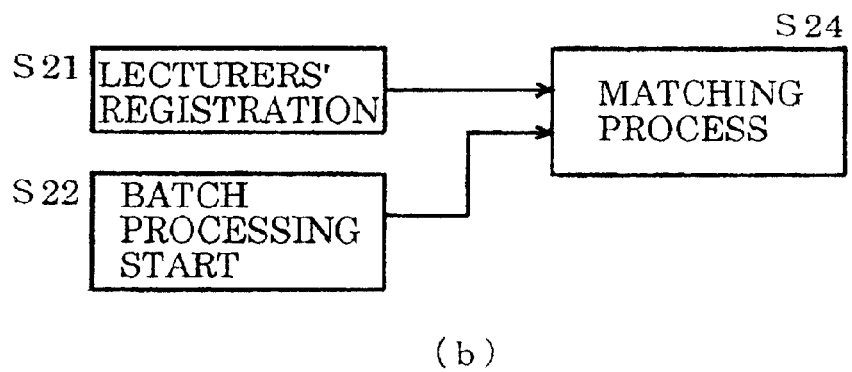
(b)

EDUCATIONAL INSTRUCTION SYSTEM

DETAIL DESCRIPTION OF THE INVENTION

1. Field of the Invention

The present invention is related to an education system for introducing teachers and students to each other using communication network such as the internet.

2. Background of the Invention

Recently, the number of people who go to adult schools to learn things for hobbies during their leisure time is rapidly increasing. Besides, correspondence courses of education are used and educational merchandise such as video tapes are sold by many learners or students at home. In addition, educational systems utilizing the internet are also popular. With such a system, teachers give lectures using cameras and whiteboards, and the texts and video data are stored in the web server. The students can attend such a lecture anywhere even at their offices or at home and at any time. With a developed system, for example, the students see the text at the display devices and click the marks for their answers by their mice, and then, the answers are checked automatically.

[Problem(s) to be Solved by the Invention]

There have been problems to be solved in the prior art described above as follows:

The correspondence courses of education using paper texts and video tape materials are not generally satisfactory in view of education fitting individual advances. Besides, it may be difficult to go to adult schools, or the adult schools near one's home may not present the courses the one wants to take. On the other hand, education system using the internet may be advantageous, because the students can attend lectures at home on man-to-man or small-class basis and they can choose any of the numeous registered courses and the teachers. However, the education system using the internet is disadvantageous in that the volume of the data may be too large and the response time may be too long for sending the whole data including video, audio and the whiteboard image data. Therefore, the educational materials in forms of hardware media such as CD-ROMs have to be sent by postage mail.

When an educational course is to be opened utilizing the general internet with only digital contents not including analogue data such as video and audio data, the whole educational materials must be digitized beforehand. Arranging such educational materials and the contents of the educational courses in a conventional method has required a lot of labor and time. However, if the video image of the lecturer obtained by video cameras is sent after compression with a properly selected size and quality, the data can be sent without excessively heavy load. The audio data can also be compressed adequately. A technique has been developed with which the image of the whiteboard can be revived with very small volume of data by extracting the detected position data of the trace of the pen, instead of treating the image data of the whiteboard.

The techniques discussed above can reduce the volume of the transmitted data to the level of 29 K/bps which can be transmitted without users' irritation via public communication lines. Thus, an education system can be realized where the image and the voice of the lecturer and the image of the board which the lecturer draws are sent via the public telephone lines or the internet, and the students see the image on their ordinary television sets. Then, the time consuming work of arranging and digitalizing the educational materials can be eliminated, and the students can attend any lectures freely at any places in a sense as if the lecturers and the students exchange e-mails.

With such a system, courses of extremely special hobbies or techniques which neighboring adult schools would not provide can be attended at any places in the world. The lecturers who can teach special hobbies etc. can utilize their special skills by collecting students from all over the world. However, the lecturers may not collect sufficient number of students if the lecturers try to collect students by themselves with their own home pages advertising their courses. The prospective students also have difficulties in searching their appropriate courses using search engines. In addition, an individual contract between a lecturer and a student may not be smoothly executed in practical management of payment and receipt of the tuition fee.

SUMMARY OF THE INVENTION

An objective of the present invention is to provide convenience to the lecturers and the students by mediating between the lecturers and the students and by acting as an agent.

The present invention achieves its objective by the constructions as follows:

[Construction 1]

An education system comprising: a lecturers' database for registering information of lectures which lecturers can provide; a students' database for registering conditions of lectures which students want to take; matching process means for matching the lectures which the lecturers can provide and the lectures which the students want to take, by picking up information of the lectures in the lecturers' database and searching for a lecture in the lecturers' database which fulfills the conditions registered in the students' database; and reservation management means for sending information of result of the matching to the lecturers and students, and for managing reservation of the lectures.

[Construction 2]

The education system according to Construction 1, further comprising: history management means for controlling transmission of data which are to be used in the lectures, and for recording history of the lectures.

[Construction 3]

The education system according to Construction 2, wherein: the history management means includes means for storing contents of the lectures which the lecturers have held and means for sending the stored contents of the lectures to the students on demand.

[Construction 4]

The education system according to Construction 1, further comprising: bill processing means for managing collection of tuition from the students and payment of tuition to the lecturers when the lectures are held.

BRIEF DESCRIPTION OF THE DRAWINGS

FIGS. 2(a) and (b) are an illustrative diagram of an embodiment of the video communication system 21 shown in FIG. 1;

FIG. 3(a) is an illustrative diagram of an embodiment of the lecturer registration data registered in the lecturers' database 16 shown in FIG. 1;

FIG. 3(b) is an illustrative diagram of an embodiment of the student registration data registered in the students' database 17 shown in FIG. 1;

FIGS. 5(a) and (b) are flow charts showing supporting process of the main server when a lecture is performed.

PREFERRED EMBODIMENTS OF THE INVENTION

Now, specific embodiments of the present invention are described.

Figure 1:
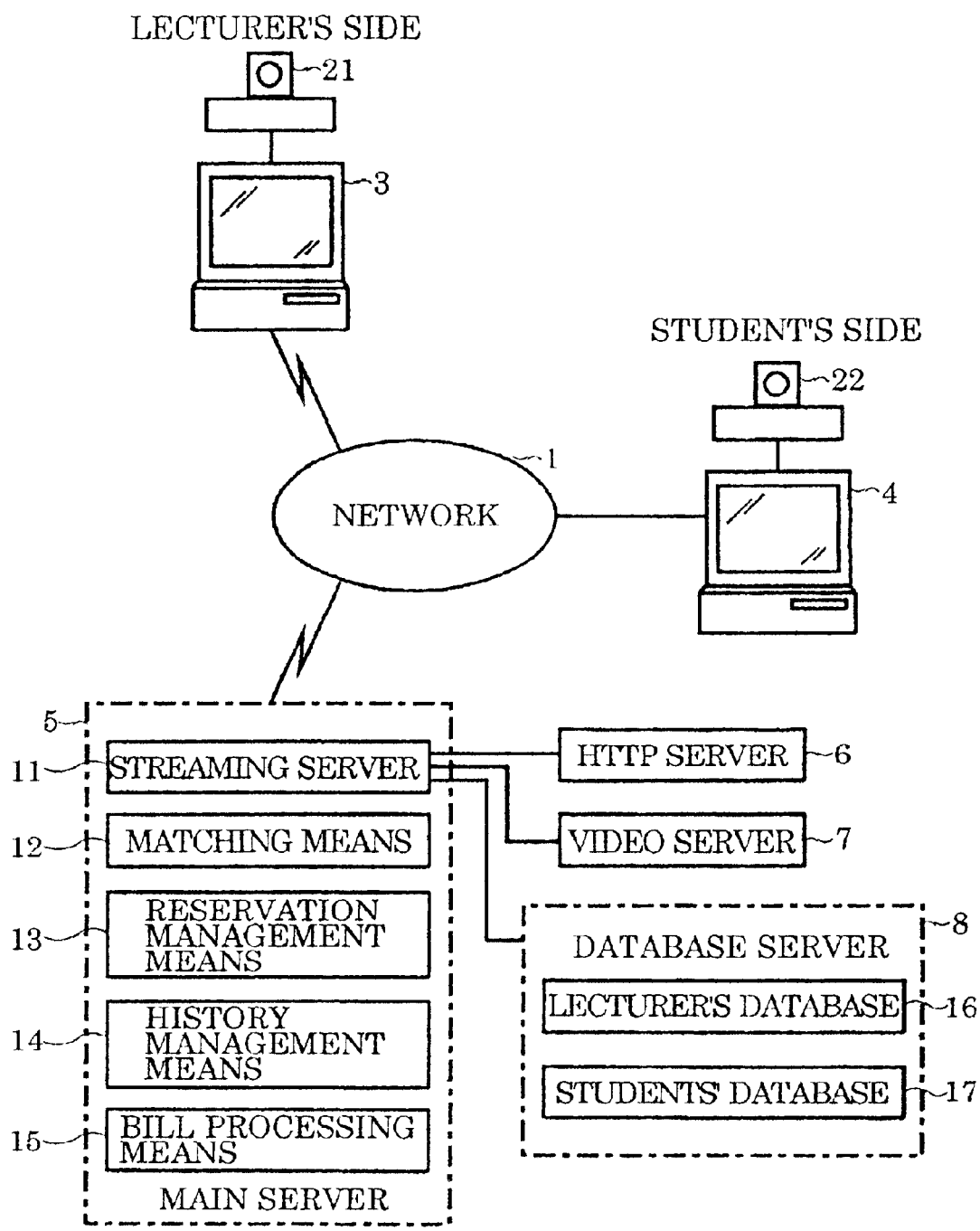
FIG. 1 is a block diagram showing an embodiment of the education system according the present invention.

FIG. 1 is a block diagram showing an embodiment of the education system according the present invention.

The illustrated system comprises a lecturer's terminal device 3, a student's terminal device 4 and a main server 5, all of them being connected to a network 1. The lecturer's terminal device 3 and the student's terminal device 4 may be disposed at any places including the users' homes and offices. The lecturer's terminal device 3 may be the lecturer's personal computer or any other terminal device for sending and receiving information. The student's terminal device 4 may be the student's terminal device such as his or her personal computer. The network 1 may be any communication network such as an intranet, an internet or a telephone network.

The main server 5 registers information about the lecturers and the students, and it introduces the lecturers to the students automatically. Thus, the system assists the lecture of the lecturers to be established. The lecturer connects the lecturer's terminal device 3 to the student's terminal device 4 via the network 1, and the lecturer holds lectures using them. The main server 4 also has functions of automatic managements of the schedule of the lectures and of billing of the tuition after the lectures are held. According to this system, even if the lecturer lives in a remote town in a foreign country, his or her lectures on special technique may be attended by any students living anywhere in the world. Besides, the tuition fee can be securely paid through this system.

In order to perform the function discussed above, the lecturer's terminal device 3 and the student's terminal device 4 are connected to video communication systems 21 and 22, respectively. The video communication systems 21 and 22 are devices for sending and receiving video and audio signals. The main server 5 has a streaming server 11, matching means 12, reservation management means 13, history management means 14 and bill processing means 15. Then the streaming server 11 is connected to a hyper text transport protocol (HTTP) sever 6, a video server 7 and a database server 8.

The database server 8 stores a lecturers' database 16 and a students' database 17. The streaming server 11 controls transmission of the data supplied from the HTTP server 6 and the video server 7 to the student's terminal device 4 etc. at stipulated times. The streaming server 11 also has a function of enabling the lecturer's terminal device 3 and the student's terminal device 4 to access the databases through the network 1.

The HTTP server 6 stores various web pages containing the information of the educational materials and the users' guide of the education system. The video server 7 provides video data including the video images for education. The database server 8 has the lecturers' database 16 storing data including the lecturers' lectures, and the students' database 17 storing data including the students' names and the conditions of the courses they would like to take. The matching means 12 compares the lecturers' database 16 and the students' database 17, and automatically introduces the students to the lecturers, and the lecturers to the students.

The reservation management means 13 manages the reservation of the lectures with combinations of the introduced lecturers and students. The history management means 14 records the lectures actually held and manages the lectures. The bill processing means 15 collects money from the student and pays to the lecturer when the lectures have been actually held. The matching means 12, the reservation management means 13, history management means 14, the bill processing means 15, etc each may comprise a computer program which is executed by the processor in the main server.

FIG. 2 is an illustrative diagram of an embodiment of the video communication system 21 shown in FIG. 1.

FIG. 2(a) is a block diagram showing hardware of the video communication system 21. This system comprises a video camera 23, a microphone 24, a board 25 and an interface box 26. The video camera 23 is used for taking and generating data of pictures and movies of the lecturer or the student. The microphone 24 is used for generating audio data. The board 25 is a so-called whiteboard. When characters are written on the board 25 with a pen 27, the coordinates of the pen tip on the board 25 are detected by sensors (not shown), and the coordinates are inputted to the terminal device 3 via the interface box 26. Thus, the characters and/or pictures written and/or drawn by the lecturer are displayed on a display device of the student's terminal device 4 shown in FIG. 1.

FIG. 2(b) is a block diagram of the lecturer's terminal device for executing its functions described above.

The terminal device 3 has a video image processing part 31, a coordinate data processing part 32, an audio signal processing part 33 and a communication control part 34. The video image processing part 31 processes the video image data taken by the video camera 23, converts the data into digital signals, compresses the signals, and sends them to the communication control part 34. The coordinate data processing part 32 sends the coordinate data inputted by the board 25 to the communication control part 34. The audio signal processing part 33 digitalizes the audio signals inputted by the microphone 24, compresses the signals, and sends them to the communication control part 34. The communication control part 34 sends the inputted signals to the network 1. The signals sent from the communication control part 34 are received by the student's terminal device 4 shown in FIG. 1, and then, they are restored to be displayed on the display device and they drive the speaker.

The device shown in FIG. 2 has functions similar to those of well-known video telephones. The lecturer may not use the board 25 and may use only the video and audio systems. If the student has similar video communication system, the student also can send the student's image interactively. The interactive system is effective especially for man-to-man or small class courses. If the student wants unilateral receiving, the student may not have a video communication system. In such a case, the student can take the course by displaying the lecture with only a terminal device 4 or a personal computer.

FIG. 3(a) shows an embodiment of the lecturer registration data registered in the lecturers' database 16 shown in FIG. 1, and FIG. 3(b) shows an embodiment of the student registration data registered in the students' database 17 shown in FIG. 1. The lecturer's registration data may include the subject of the lecture, date and time of the lecture, the lecturer's account for the tuition payment, the lecturer's e-mail address, method of the lecture, the lecturer's profile and the text. The subject of the lecture represents the content of the lecture in plain words. The date and time of the lecture may show convenient dates or days of the week and times when the lecturer can give lectures.

The lecturer's account for the tuition payment shows the account number on which the tuition fee is received by the lecturer. The lecturer's e-mail address is shown for introducing the lecturer to the students automatically or for introducing the students to the lecturer automatically. The "method of the lecture" may show whether the lecture is held with a single student on man-to-man basis interactively, or the lecture is given by the lecturer to many students unilaterally, for example. The "lecturer's profile" shows the lecturer's self introduction or advertisement. When a text, such as an educational material made by the lecturer with a word processor, is used for the lecture, it can be included in the "text" posted on the lecturer registration data.

The lecturer registration data described above may be inputted by the lecturer using the lecturer's terminal device 3. The input form may be supplied by the HTTP server 6 shown in FIG. 1, for example. That is, the HTTP server 6 displays the registration sheet with items shown in FIG. 3(a), for example. The lecturer who wants to be registered inputs the lecturer's data under the items shown in FIG. 3(a), using the web page. The inputted data are registered in the lecturers' database 16.

The student's registration data shown in FIG. 3(b) may include the subject which the student wants to take, the days and times when the student wants to attend lectures, the student's account for paying the tuition fee, the student's e-mail address, method of taking the lecture and the lecturers the student wants. The contents and the name of the lecture are inputted on the line of "subject student wants to take". "Days and times when student wants to attend lectures" are inputs for the dates, the days of the week and the times when the student can or wants to attend lectures. In the line of "student's account for tuition payment", the student's account number for paying the tuition fee is inputted. The student's e-mail address is used for introducing the lecturers and for appointments. "Method of lecture" shows the method in which the student wants to attend the lectures, interactive way or unilateral way, for example.

As for "lecturers student wants", the student may look up the lecturers' database 16, search a lecturer of the course the student wants take, and input the lecturer. If there are a plurality of lecturers who give lectures of the same subject which the student wants to take, the student can register the lecturers with the student's priorities after checking the contents and the tuition fees of the lectures etc. The student can input the student registration data at any time using the web page for the student registration.

In the system shown in FIG. 1, when there are lecturers or students in the lecturers' database 16 or the students' database 17 who have any registrations which have not matched with the appropriate opponents, the contents of the registrations may be displayed on a bulletin board on the internet, for example, except when the lecturers or students want to keep it secret, for example. Thus, a student may search for his or her favorite lecture among the lectures which have vacant seats for students, and input the lecturer's name on the line of "the lecturers the student wants" shown in FIG. 3(b). With the system of the present invention, appropriate lectures can also be introduced to students automatically. Thus, the student can register without any specific lecturers inputted on the line of the name of the lecturer who the student wants.

Now the operation of the system according to the present invention shown in FIG. 1 is discussed.

Figure 4:
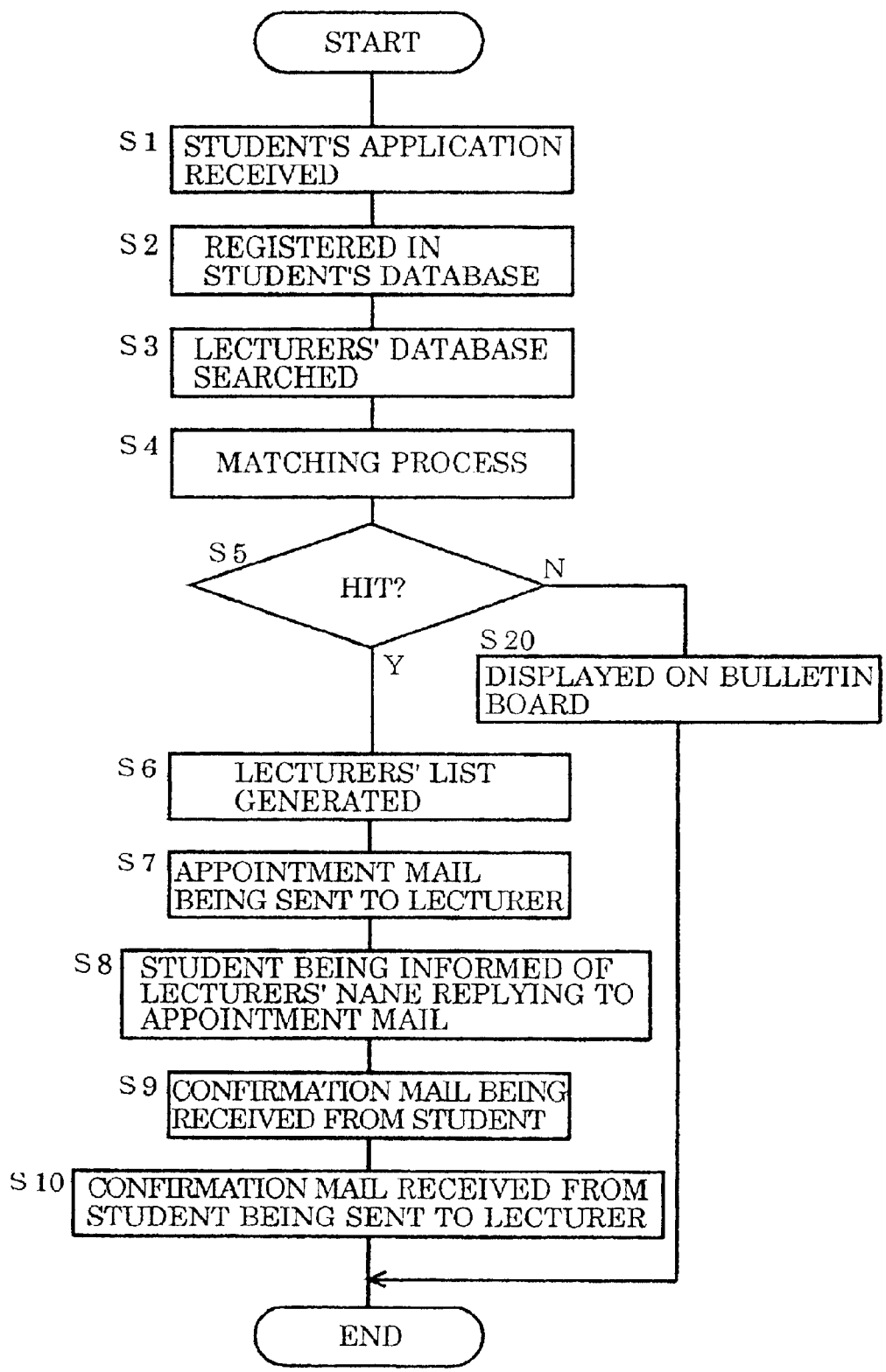
FIG. 4 is a flow chart showing operation of the matching means 12 and the reservation management means 13 of the main server 5.

FIG. 4 is a flow chart showing operation of the matching means 12 and the reservation management means 13 of the main server 5.

First, the matching means 12 of the main server 5 shown in FIG. 1 compares the lecturer registration data and the student registration data, introduces the lecturers to the students, and introduces the students to the lecturers through matching procedure. In the example shown in FIG. 4, when the student has inputted the student registration data and has completed registration, automatic matching process is performed.

First, the student's application is received at Step S1. At this step, the student accesses the HTTP server 6 through the student's terminal device and the network 1, and opens the web page for registration application, as described before. Then the student inputs the registration data as described before referring to FIG. 3. These data are registered in the students' database 17 (Step S2). Then, the lecturers' database 16 is searched referring to the new registration data at Step S3. Then, matching process is performed to match the student's subject and the lecturer's course, and then, date and time of the course and the student's convenient date and time. Through this matching process, one or more lecturers who have lectures the student wants to attend at the student's convenient date and time may be picked up.

The procedure described above is a case when the student has not inputted his or her favorite lecturer. If the student has inputted the favorite lecturer, the procedure may jump from Step S2 to Step S7. At the matching process (Step S4), the number of the picked up lectures may be one, more than one or zero. At Step S5, the number of the picked up lectures is decided. If one or more lectures have been picked up, the procedure goes to Step S6 and the lecturers' list is generated. If no lecturers have been picked up, the student's terminal device displays the result and student's information is added on the list of the students who want lecturers on the bulletin board (Step S20). The list on the bulletin board may include the subjects, available dates and times and methods of taking lectures of the suspended students.

At Step S7, an appointment mail is sent to the lecturer. If more than one lecturer have been picked up, the mail is sent to the first lecturer on the list. If the student has inputted one or more lecturers' names, the mail is sent to the first lecturer the student has listed up. When there is a reply mail informing that the lecturer can give the lecture, the student is informed of the name of the lecturer who has replied to the appointment mail and the lecturer's e-mail address at Step S8. If the lecturer already has full capacity of students when the appointment mail was sent to the lecturer, the lecturer may send a negative reply.

In such a case, a second appointment mail would be sent to a second lecturer on the list, and then a third and a fourth mail to a third and a fourth lecture, successively. The student, who has received the message announcing the lecturer's name responding to the appointment mail, responds to the main server as a confirmation mail at Step S9. The confirmation mail received by the main server is then sent to the lecturer at Step S10. Thus, a lecture contract is established if the lecturer has been introduced to the student and the appointment has been completed by the day before the lecture is to be held. The condition including the tuition fee for the lecture is agreed upon at the time of making the appointment, and the contract on the tuition payment has been also established. The whole process can be automated by a computer, so that the process may be speedy and both the lecturer and the student would not have to wait long. Steps from S3 to S6 described above may be executed by the matching means 12 shown in FIG. 1, and Steps from S7 to S10 may be executed by the reservation management means 13 shown in FIG. 1.

FIG. 5 shows an example of supporting process by the main server when a lecture is performed. At Step S11 shown in FIG. 5, the history management means 14 sends confirmation mails to the lecturer and the student(s) on the day before the lecture, based on the settled data which were informed of by the reservation management means 13. Then at Step S12, during the lecture, the main server may relay or distribute the content of the lecture if required. For example, in case of a one-way lecture, the lecture itself is stored in the video server. Thus, the lecture can be sent to the other students on demand later. On the other hand, in case of an interactive lecture, the terminal devices of the lecturer and the student(s) may be connected to each other via the streaming server 11, so that the real time distribution process can be executed.

The result of the lecture is recorded by the history management means 14. The content of the lecture may be translated into another language automatically, and distributed. Next, at Step S13, the bill processing means 15 executes bill processing. At Step S14, the tuition fee is received from the student by drawing the tuition fee from the tuition payment account registered in the student registration data. Then at Step S15, the tuition fee is sent to the tuition fee receiving account registered in the lecturer registration data. At that time, the tuition fee sent to the lecturer amounts to the tuition fee paid by the student subtracted by the service management charge of the main server side. The billing process may use conventional account settling system for internet mail order business. For example, billing process is performed automatically, securely and smoothly using pre-paid type electronic money.

In the example shown in FIG. 4, the lecturer is introduced on a real time basis when the student has inputted to the database. However, alternatively, the matching may be performed when the lecture has inputted to the lecturers' database, and then, the student may be introduced on a real time basis. On that time, if the lecturer does not find any student, the lecturer may be listed up on the bulletin board. The list on the bulletin board may include the subject, the outline of the lecture, date and time and the lecturer's profile. Since the students who have not decided the lecturers and the lecturers who have not decided the students are both registered in databases, matching can be performed using only those databases. The bulletin board may also be used for advertisement of collecting new lecturers or new students. Alternatively, batch process of matching at specified intervals may be possible.

FIG. 5(*b*) shows such alternative procedures. After the registration of the lecturer at Step S21, or after periodic process is started at Step S22, the matching process (Step S24) may be performed. The batch process may be preferred only when real time process cannot be applied, because real time matching is generally preferable where the matching process is performed when a student or a lecturer is registered. In such a case, the students are allocated to the lectures one by one.

In the embodiment described above, the main server sends massages to the lecturer's and student's terminal devices by e-mail. The massages may be sent alternatively by automatic telephone guide or by automatic facsimile. The replies from the lecturer and the student are preferably by e-mail because the system of the present invention is preferably operated automatically without any manual handling. However, telephone reply using "dial tone" method which is conventionally used in making reservations on the telephone or facsimile reply using optical character reading method can be applied for automatic operation. The system described above includes a system for introducing lecturers and students to each other, a distribution system of data and image required for lecture itself, and a bill processing system. Alternatively, any one of the component systems or any combination of them can be executed separately. Besides, each one of the component systems can be patternized, and can be fully automated.

The functional blocks of the main server shown in FIG. 1 may be formed in separate program modules, or alternatively, formed in a single integrated program module. All or some of the functional blocks of the main server may also be formed in hardware of logic circuits. Furthermore, the program modules may be performed in combination with an existing application program, or alternatively, may be performed as independent programs. In addition, card-type CD-ROMs may be distributed to the lecturers' and students' terminal devices for advertisement and for automatic access to the home page of the main server.

By the system according to the present invention, the lecturers and the students are automatically introduced to each other using the database server, and the lectures can be held wherever the lecturers and the students may be in Japan or in any other places in the world. Therefore, any abilities of the lecturers of any kinds living in any places in the world can be utilized in providing services to the students. Besides, both the lecturers and the students can use this introduction system without anxiety because of the reservation management and the bill processing services. The system may be operated efficiently and speedily at low cost by automatic operation using the main server, the database server etc. as the embodiment described above without manual handling.

What is claimed is:

1. An education system comprising:

a server connected to a lecturers' terminal and a student's terminal via network; a lecturers' database in the server for registering information of lectures which lecturers can provide;

a students' database in the server for registering conditions of lectures which students want to take;

matching process means in the server for comparing the lecturer registration data in the lecturers' database and the student registration data in the students' database and matching the lectures which the lecturers can provide and the lectures which the students want to take and sending information of result of the matching process to the lecturers and students;

first means in the server for starting the matching process and introducing the lecturers to the students by sending the lecturer registration data, when the lecture, which students want to take, has been inputted through the student's terminal; and second means in the server for starting the matching process and introducing the students to the lecturers by sending the student registration data, when the lecture, which lecturers can provide, has been inputted through the lecturer's terminal.

2. The education system according to claim 1, further comprising reservation management means for managing reservation of the lectures.

3. The education system according to claim 1, further comprising history management means for controlling transmission of data which are to be used in the lectures and for recording history of the lectures.

4. The education system according to claim 3, wherein the history management means includes means for storing contents of the lectures which the lecturers have held and means for sending the stored contents of the lectures to the students on demand.

5. The education system according to claim 3, further comprising bill processing means for managing collection of tuition from the students and payment of tuition to the lecturers when the lectures are held.

* * * * *